US012652193B2

(12) United States Patent
Powell, III et al.

(10) Patent No.: US 12,652,193 B2
(45) Date of Patent: Jun. 9, 2026

(54) SYSTEMS AND METHODS FOR AUTOMATIC TUNNEL ESTABLISHMENT WITH ADDRESS DECONFLICTION

(71) Applicant: L3Harris Global Communications, Inc., Melbourne, FL (US)

(72) Inventors: Nelson Henry Powell, III, Penfield, NY (US); Benjamin Thomas LaGreca, Lockport, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 322 days.

(21) Appl. No.: 18/536,444

(22) Filed: Dec. 12, 2023

(65) Prior Publication Data

US 2025/0193044 A1     Jun. 12, 2025

(51) Int. Cl.
*H04L 12/46* (2006.01)

(52) U.S. Cl.
CPC ................................. *H04L 12/4633* (2013.01)

(58) Field of Classification Search
CPC ... H04L 12/4633; H04L 12/18; H04L 12/185; H04L 45/54; H04L 61/5061;
(Continued)

(56) References Cited

U.S. PATENT DOCUMENTS

| | | | | |
|---|---|---|---|---|
| 7,570,605 B1 * | 8/2009 | Aggarwal | ............... | H04L 12/18 |
| | | | | 370/256 |
| 10,003,531 B2 | 6/2018 | Zhou | | |

(Continued)

FOREIGN PATENT DOCUMENTS

| | | |
|---|---|---|
| CN | 101488902 | 7/2009 |
| CN | 101488902 A * | 7/2009 |

(Continued)

OTHER PUBLICATIONS

Higgins et al., "Tunneling multicast traffic through non-multicast-aware networks and encryption devices," 2001 MILCOM Proceedings Communications for Network-Centric Operations: Creating the Information Force (Cat. No.01CH37277), pp. 296-300 (2001).

(Continued)

*Primary Examiner* — Khoa Huynh

(74) *Attorney, Agent, or Firm* — Fox Rothschild LLP; Carol E. Thordstad-Forsyth

(57) ABSTRACT

Systems and methods for automatically managing tunnels in a network. The methods comprise: detecting, by a router of the network, that a tunnel is needed for communicating a packet to at least one member of a multicast group of another network; selecting, by the router, a base address from a set of unused base addresses; communicating, from the router, an auto-tunnel create message including the base address which was previously selected; receiving, by the router, a tunnel create ACK message sent from another router of the network upon the another router's verification that base address is unused; creating the tunnel using the base address for the router and another base address for the another router; encapsulating the packet; and communicating the encapsulated packet from the router to the another router using the tunnel which was created.

19 Claims, 10 Drawing Sheets

(58) Field of Classification Search
CPC ..... H04L 2212/00; H04L 45/16; H04L 45/74;
H04W 8/26
See application file for complete search history.

(56) References Cited

U.S. PATENT DOCUMENTS

| | | | | |
|---|---|---|---|---|
| 10,708,295 | B1 * | 7/2020 | Hagelstrom | .......... H04L 63/145 |
| 2008/0077651 | A1 * | 3/2008 | Lee | ..................... H04L 12/1895 |
| | | | | 709/203 |

FOREIGN PATENT DOCUMENTS

| | | | | |
|---|---|---|---|---|
| CN | 101815106 | | 8/2010 | |
| CN | 102916881 | | 2/2013 | |
| CN | 109600293 | | 4/2019 | |
| EP | 1075118 | | 6/2006 | |
| EP | 1794977 | | 2/2009 | |
| EP | 2179539 | | 4/2010 | |
| JP | 2009010606 | A * | 1/2009 | |
| KR | 100694302 | B1 * | 3/2007 | ............. H04W 8/26 |
| WO | WO-2010136023 | A1 * | 12/2010 | ............. H04L 65/80 |

OTHER PUBLICATIONS

Kim et al., "Dynamic IP tunneling for next generation mobile networks," 2017 IEEE 28th Annual International Symposium on Personal, Indoor, and Mobile Radio Communications (PIMRC), 7 pages (2017).

* cited by examiner

- Solid arrows demonstrate initial transmission.
- Dashed arrows illustrate duplicate transmission.
- Only first few rounds of transmission shown.

- Solid arrows demonstrate transmission.
- No duplicate transmission.

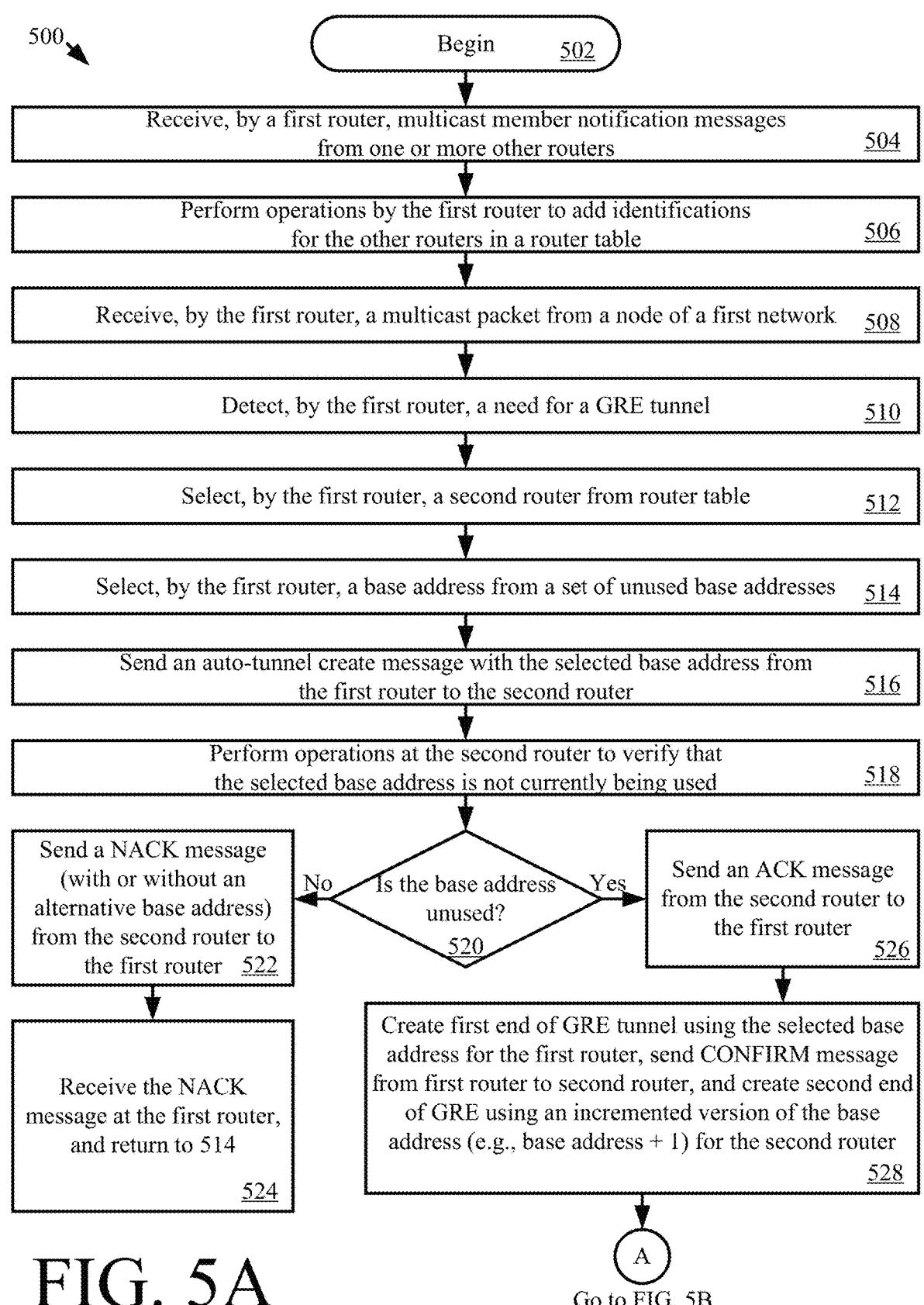

500

Begin    502

Receive, by a first router, multicast member notification messages from one or more other routers    504

Perform operations by the first router to add identifications for the other routers in a router table    506

Receive, by the first router, a multicast packet from a node of a first network    508

Detect, by the first router, a need for a GRE tunnel    510

Select, by the first router, a second router from router table    512

Select, by the first router, a base address from a set of unused base addresses    514

Send an auto-tunnel create message with the selected base address from the first router to the second router    516

Perform operations at the second router to verify that the selected base address is not currently being used    518

Send a NACK message (with or without an alternative base address) from the second router to the first router    522

Is the base address unused?    520

No    Yes

Send an ACK message from the second router to the first router    526

Receive the NACK message at the first router, and return to 514    524

Create first end of GRE tunnel using the selected base address for the first router, send CONFIRM message from first router to second router, and create second end of GRE using an incremented version of the base address (e.g., base address + 1) for the second router    528

From FIG. 5A ( A )

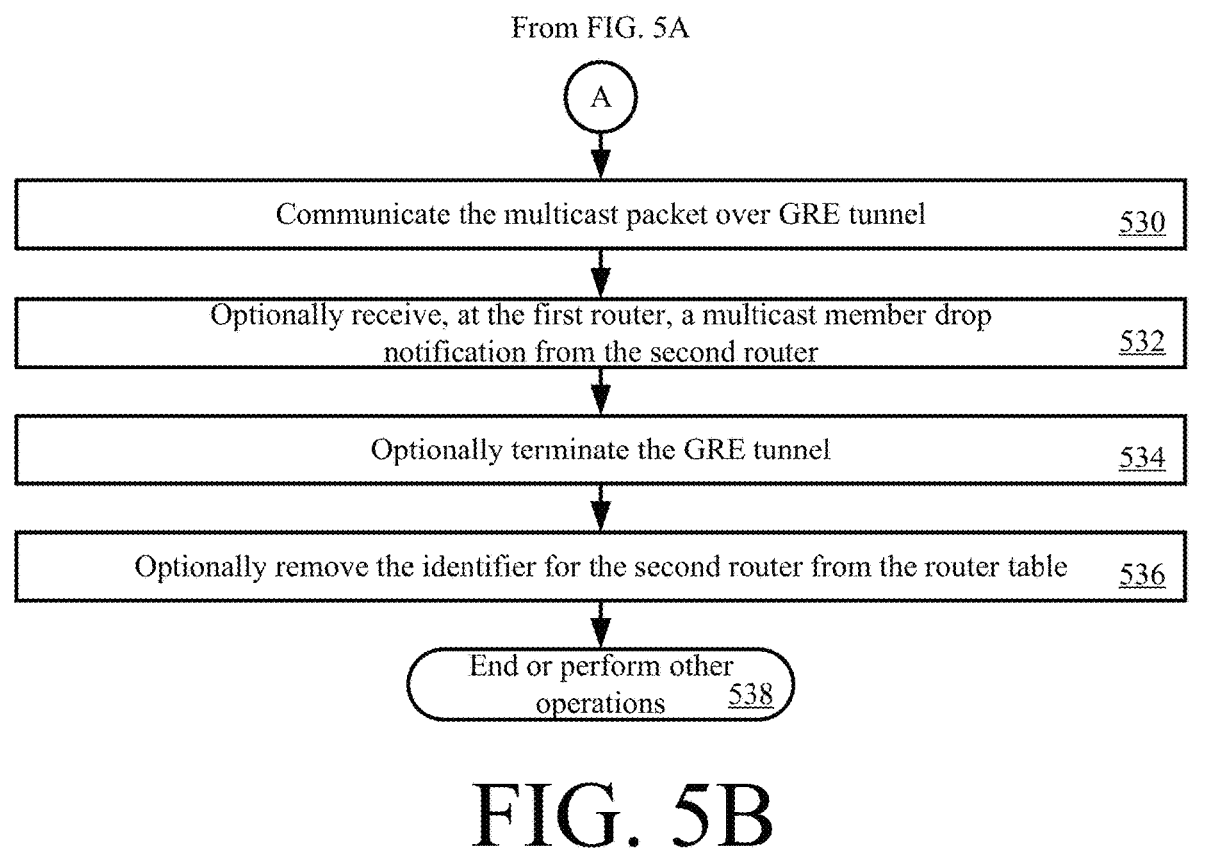

| Communicate the multicast packet over GRE tunnel | 530 |

| Optionally receive, at the first router, a multicast member drop notification from the second router | 532 |

| Optionally terminate the GRE tunnel | 534 |

| Optionally remove the identifier for the second router from the router table | 536 |

End or perform other operations   538

FIG. 5B

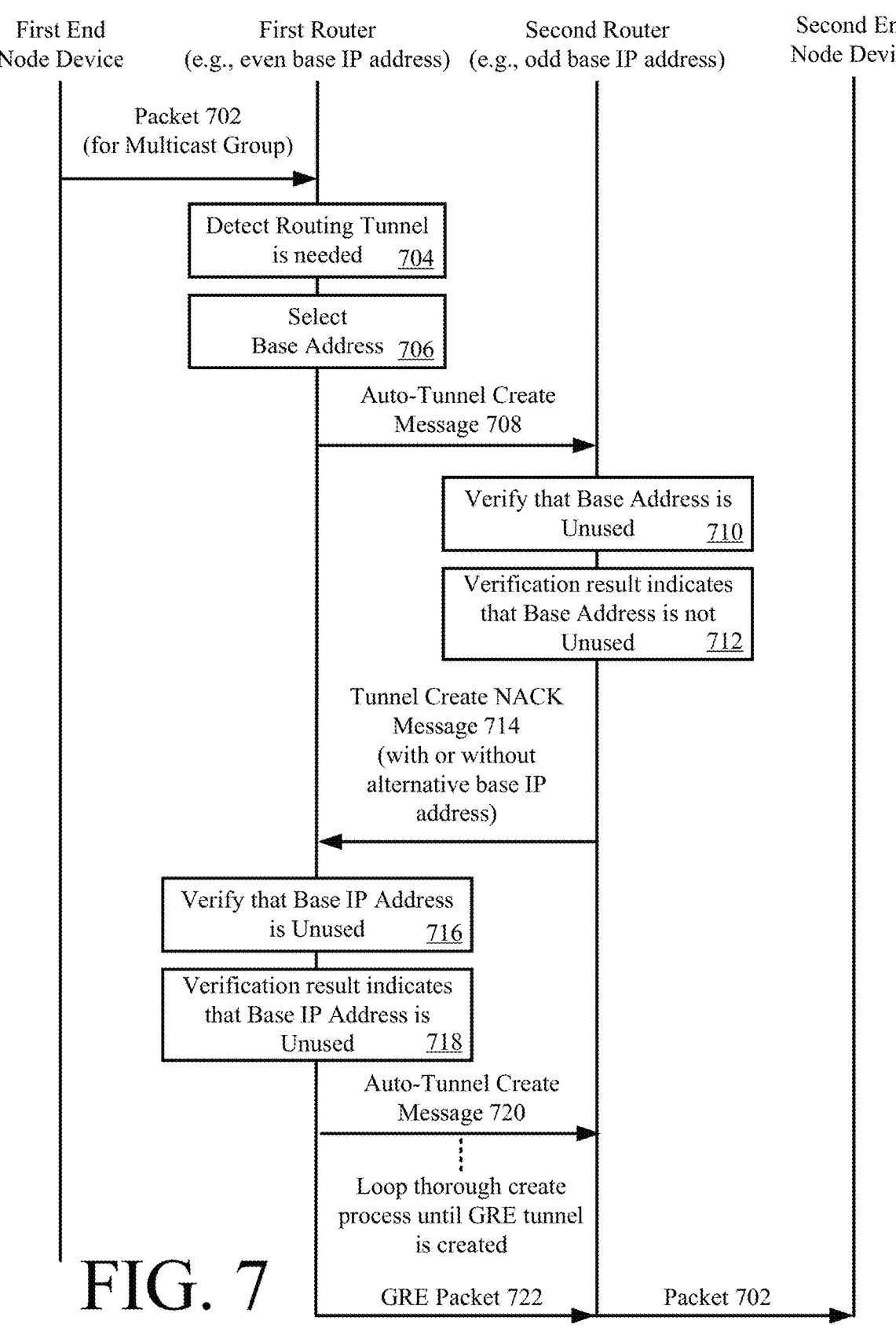

First End
Node Device

First Router
(e.g., even base IP address)

Second Router
(e.g., odd base IP address)

Second End
Node Device

Packet 702
(for Multicast Group)

Detect Routing Tunnel
is needed     704

Select
Base Address   706

Auto-Tunnel Create
Message 708

Verify that Base Address is
Unused          710

Verification result indicates
that Base Address is not
Unused          712

Tunnel Create NACK
Message 714
(with or without
alternative base IP
address)

Verify that Base IP Address
is Unused        716

Verification result indicates
that Base IP Address is
Unused          718

Auto-Tunnel Create
Message 720

Loop thorough create
process until GRE tunnel
is created

GRE Packet 722          Packet 702

FIG. 7

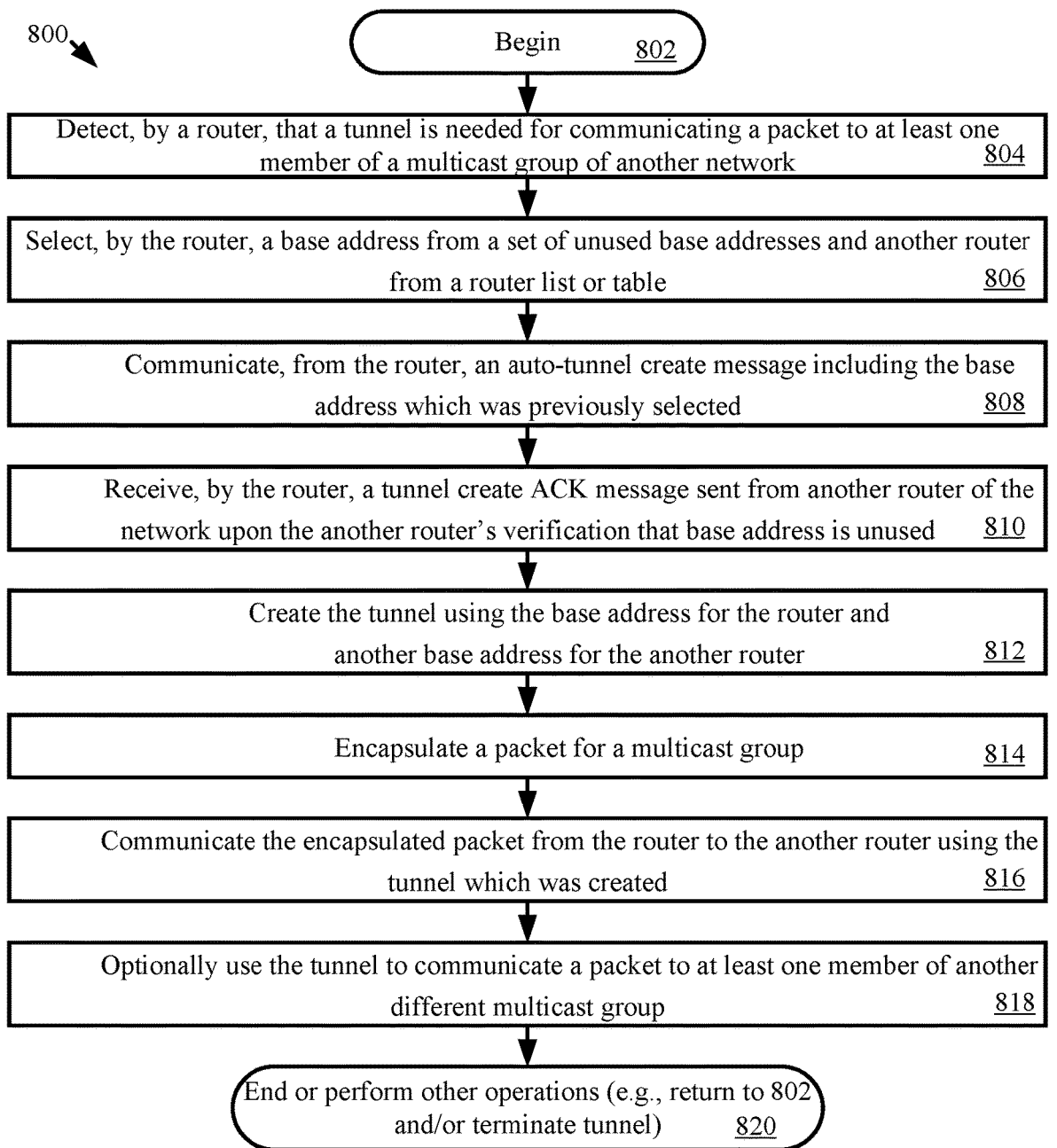

800

Begin _802_

Detect, by a router, that a tunnel is needed for communicating a packet to at least one member of a multicast group of another network     _804_

Select, by the router, a base address from a set of unused base addresses and another router from a router list or table     _806_

Communicate, from the router, an auto-tunnel create message including the base address which was previously selected     _808_

Receive, by the router, a tunnel create ACK message sent from another router of the network upon the another router's verification that base address is unused     _810_

Create the tunnel using the base address for the router and another base address for the another router     _812_

Encapsulate a packet for a multicast group     _814_

Communicate the encapsulated packet from the router to the another router using the tunnel which was created     _816_

Optionally use the tunnel to communicate a packet to at least one member of another different multicast group     _818_

End or perform other operations (e.g., return to 802 and/or terminate tunnel)     _820_

FIG. 8

SYSTEMS AND METHODS FOR AUTOMATIC TUNNEL ESTABLISHMENT WITH ADDRESS DECONFLICTION

BACKGROUND

Statement of the Technical Field

The present document concerns computing systems. More specifically, the present document concerns systems and methods for automatic tunnel establishment with address deconfliction.

Description of the Related Art

Generic Routing Encapsulation (GRE) is a protocol for encapsulating packets received from a first network (e.g., an internet protocol (IP) version 4 (IPv4) network) with GRE packets to facilitate a direct point-to-point connection across another different second network (e.g., another IPv4 network). A GRE tunnel is usually provided between two routers. Each router acts like an end of the GRE tunnel, and therefore is configured to send and receive GRE packets. The GRE packets comprise a payload, a GRE header and an IP header. The payload includes the packet received from the first network. The GRE header indicates the type of protocol used to encapsulate the packet.

SUMMARY

This document concerns systems and methods for automatically managing tunnels in a network. The tunnel can include, but is not limited to, GRE tunnels. The methods comprise: detecting, by a router of the network, that a tunnel is needed for communicating a packet to at least one member of a multicast group of another network; selecting, by the router, a base address from a set of unused base addresses; communicating, from the router, an auto-tunnel create message including the base address which was previously selected; receiving, by the router, a tunnel create acknowledgement (ACK) message sent from another router of the network upon the another router's verification that the base address is unused; creating the tunnel using the base address for the router and another base address for the another router; encapsulating the packet; and communicating the encapsulated packet from the router to the another router using the tunnel which was created.

In some scenarios, the another base address may be generated by incrementing the base address by a specified number. The base address may be an even numbered address, and the another base address may be an odd numbered address. In this case, the specified number may be one such that the another base address is generated by adding one to the base address. The set of unused base addresses may include, but is not limited to, IPv4 class E addresses.

In those or other scenarios, the methods also comprise: receiving, by the router, a multicast member notification from the another router; adding an identifier for the another router to a router table or list that is maintained by the router; selecting the another router from the router table or list in; receiving, by the router, a multicast member drop notification from the another router; and/or removing the identifier for the another router from the router table or list in response to the multicast member drop notification.

Additionally or alternatively, the methods comprise: using the tunnel to communicate a packet to at least one member of another different multicast group; and/or terminating the tunnel after said communicating.

In those or other scenarios, the methods comprise: receiving, by the router, a tunnel create negative acknowledgement (NACK) message sent from the another router of the network when the another router determines that the base address is used; receiving, by the router, an alternative base address from the another router along with the tunnel create NACK message; and/or creating another tunnel using the alternative base address for the router and an incremented version of the alternative base address for the another router.

This document also concerns a router. The router comprises: a processor; and a non-transitory computer-readable storage medium comprising programming instructions that are configured to cause the processor to implement a method for automatically managing tunnels in a network. The programming instructions comprise instructions to: detect that a tunnel is needed for communicating a packet to at least one member of a multicast group of another network; select a base address from a set of unused base addresses; communicate an auto-tunnel create message including the base address which was previously selected; receive a tunnel create ACK message sent from another router upon the another router's verification that base address is unused; create the tunnel using the base address for the router and another address (e.g., the base address plus an offset) for the another router; encapsulate the packet; and communicate the encapsulated packet from the router to the another router using the tunnel which was created. The base address may be an even numbered address, and the another base address may be an odd numbered address. The set of unused base addresses can include, but is not limited to, IPv4 class E addresses.

The programming instructions may also comprise instructions to: receive a multicast member notification from the another router; add an identifier for the another router to a router table or list that is maintained by the router; select the another router from the router table or list after detect that a tunnel is needed; receive a multicast member drop notification from the another router; and remove the identifier for the another router from the router table or list in response to the multicast member drop notification.

Additionally or alternatively, the programming instructions comprise instructions to: use the tunnel to communicate a packet to at least one member of another different multicast group; and/or terminate the tunnel after the encapsulated packet is communicated over the tunnel.

In those or other scenarios, the programming instructions further comprise instructions to: receive a tunnel create NACK message sent from the another router when the another router determines that the base address is not unused; receive an alternative base address from the another router along with the tunnel create NACK message; and/or create another tunnel using the alternative base address for the router and an incremented version of the alternative base address for the another router.

BRIEF DESCRIPTION OF THE DRAWINGS

This disclosure is facilitated by reference to the following drawing figures, in which like numerals represent like items throughout the figures.

The present solution is not limited to embodiments with a single GRE tunnel. The system can have multiple tunnels to multiple other routers.

Figure 2:
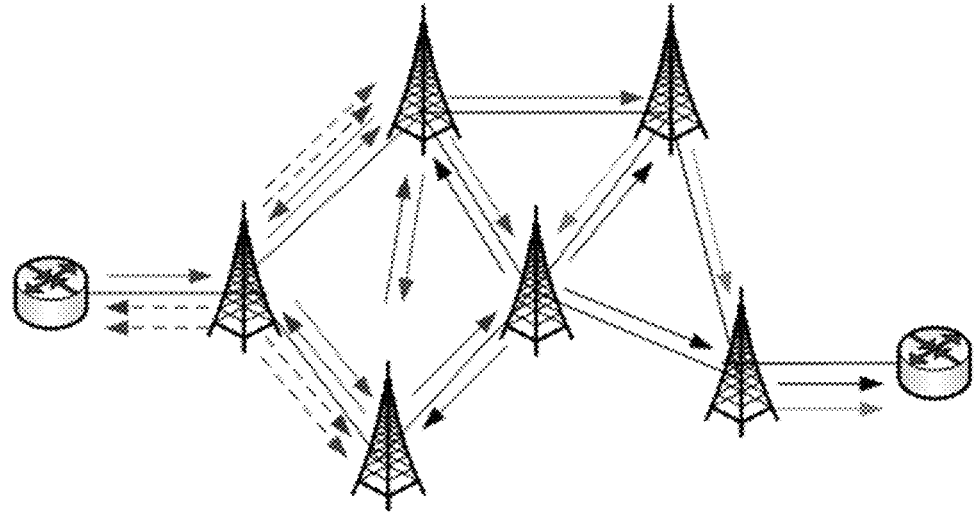
Figure 3:
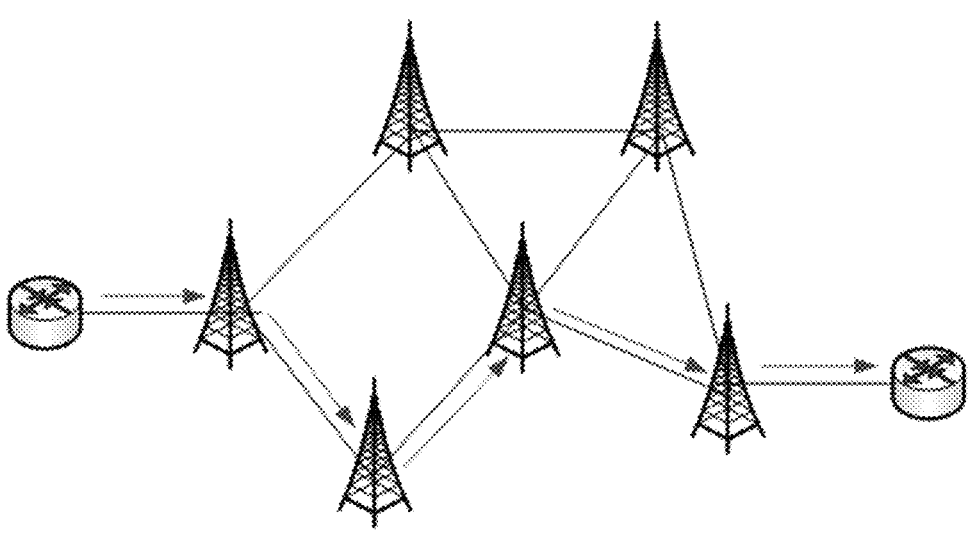

FIGS. 2-3 provide illustrations that are useful for understanding the effect of GRE tunneling with multicast traffic across wireless networks.

Figure 4:
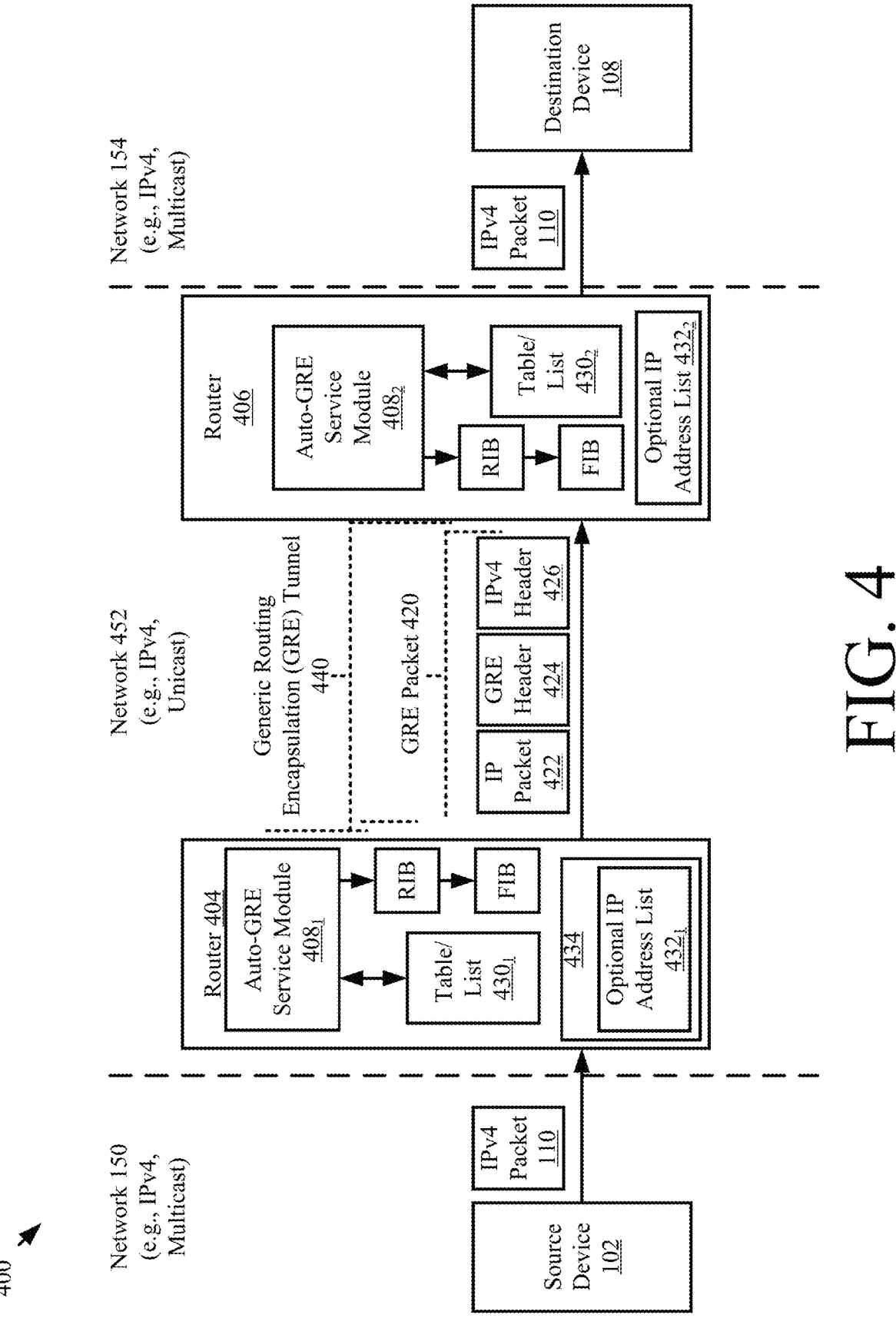

FIG. 4 provides an illustration of a system implementing the present solution.

FIGS. 5A-5B (collectively referred to herein as "FIG. 5") provides a flow diagram of a method for establishing a GRE tunnel in accordance with the present solution.

Figure 6A:
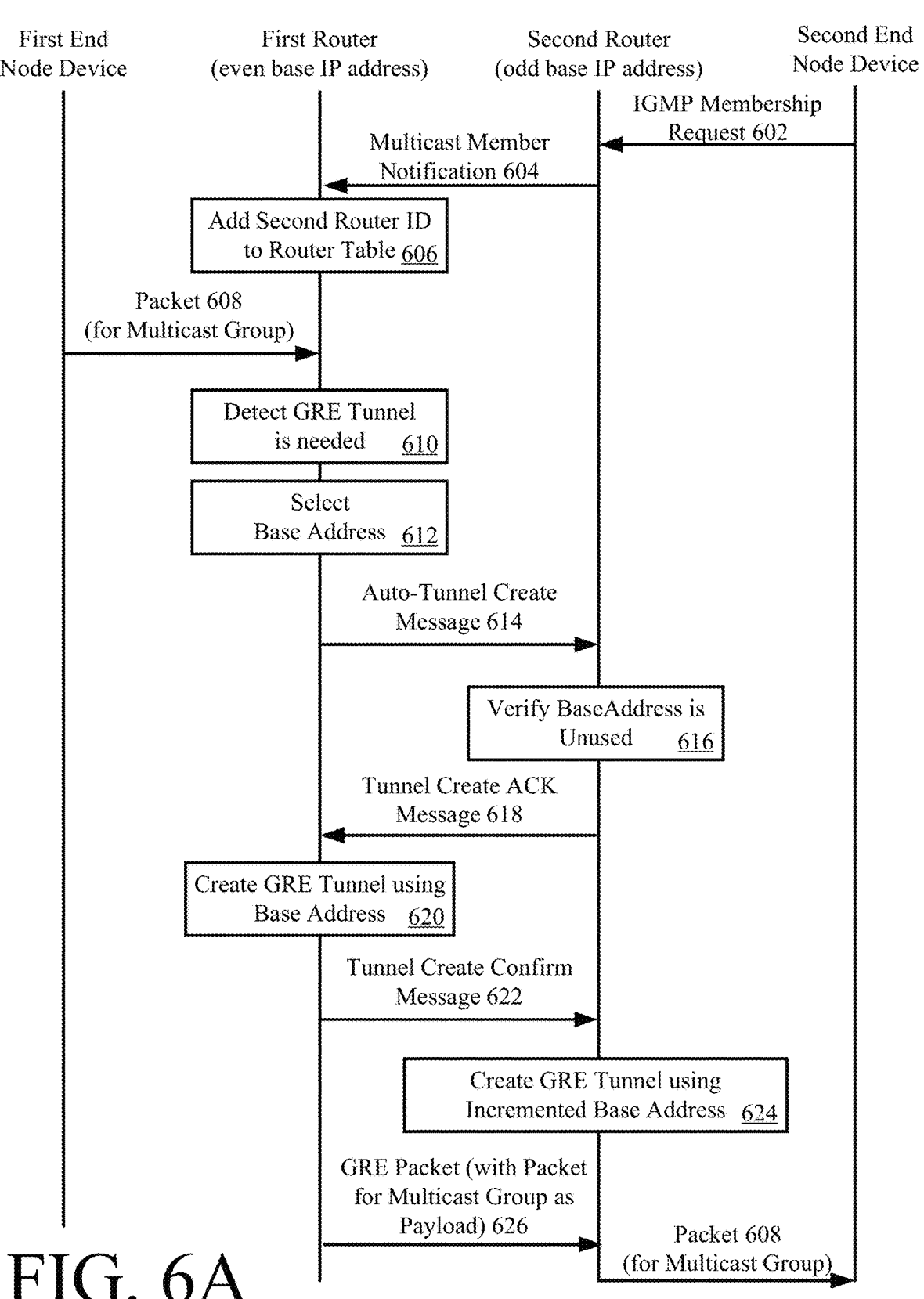
Figure 6B:
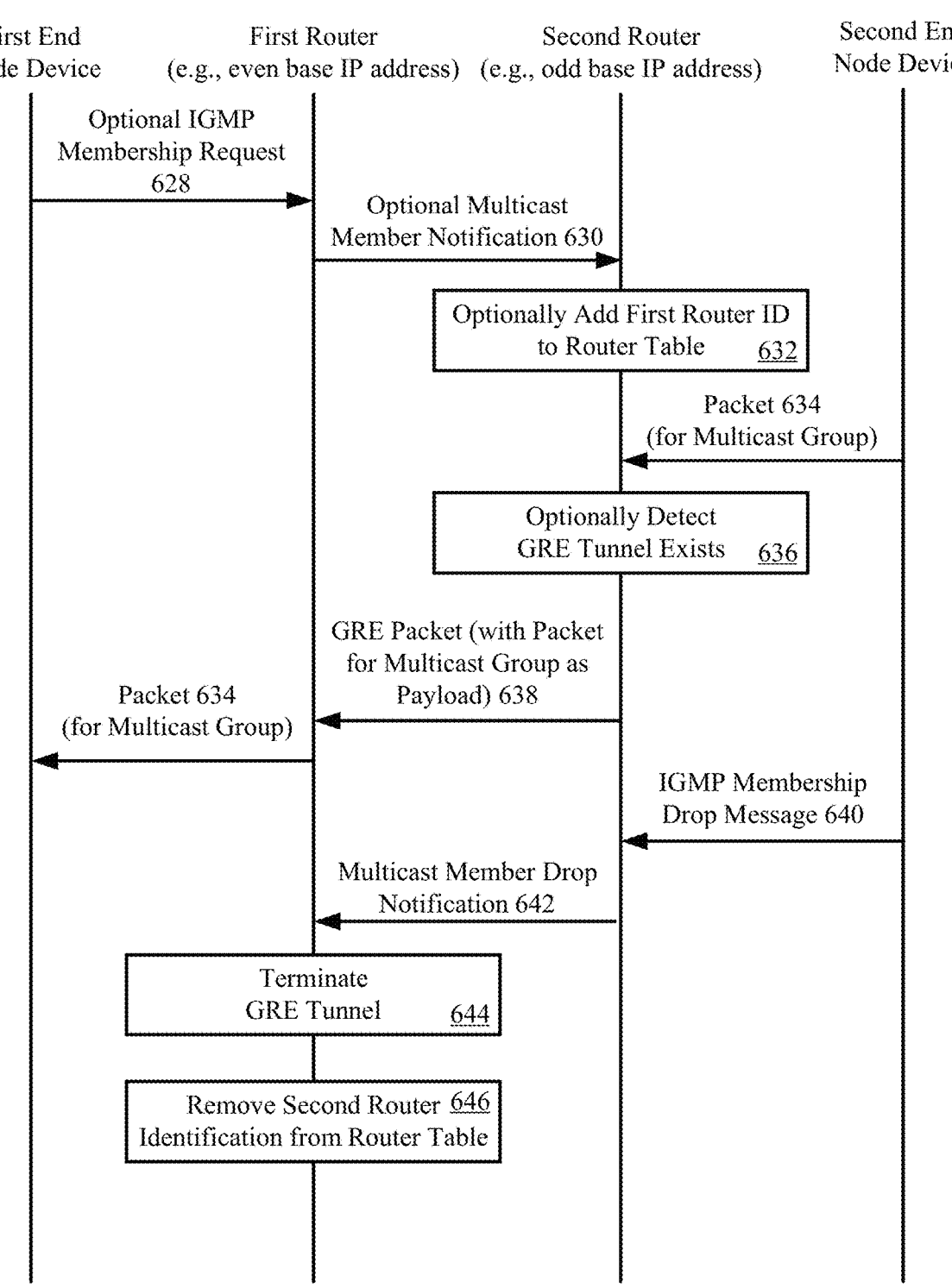

FIGS. 6A-6B (collectively referred to herein as "FIG. 6") provides an illustration showing messaging between nodes for creating and terminating a GRE tunnel.

FIG. 7 provides an illustration showing messaging between nodes for creating and terminating a GRE tunnel.

FIG. 8 provides a flow diagram of a method for automatically managing tunnels in a network.

Figure 9:
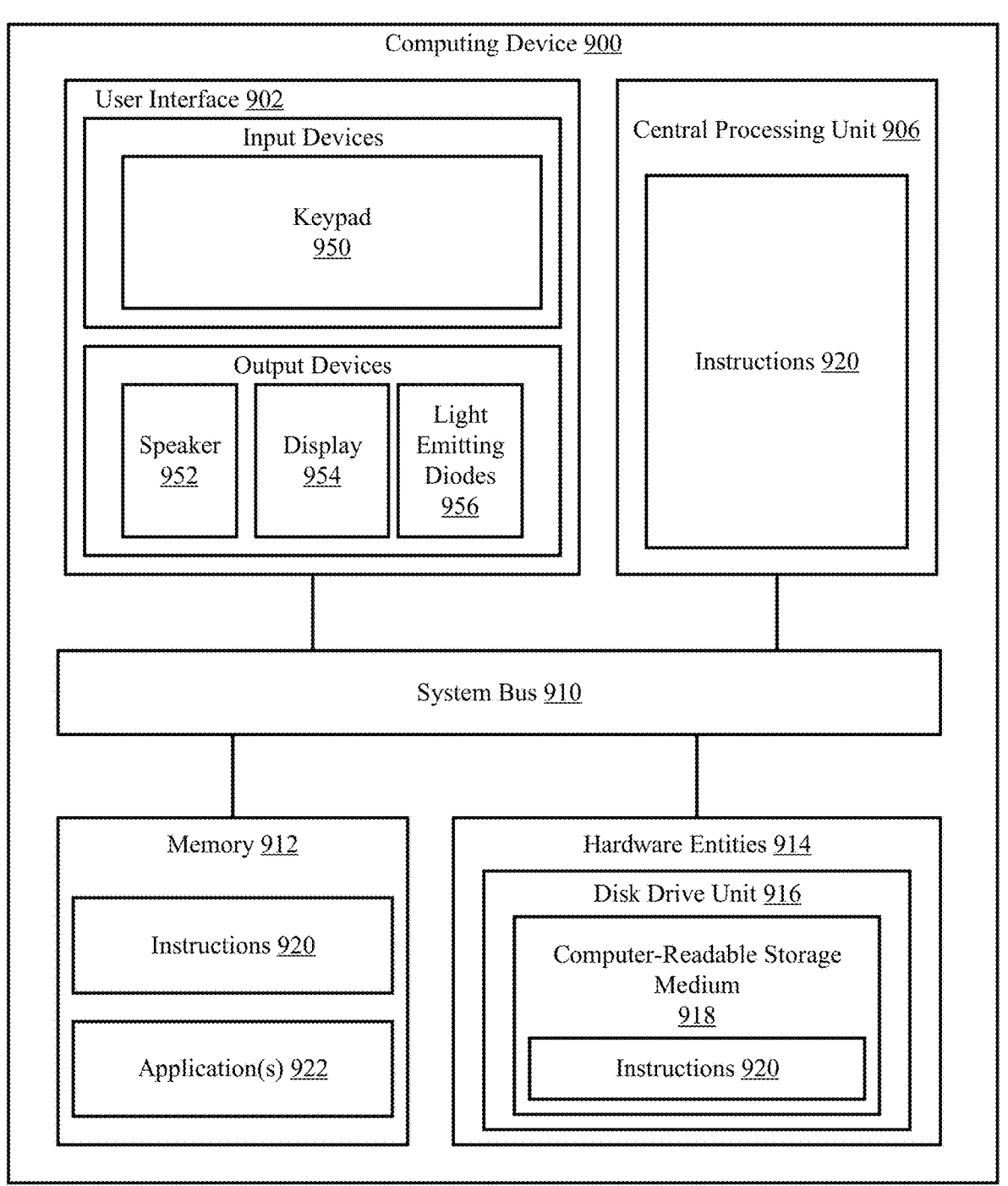

FIG. 9 provides a block diagram of an illustrative computing device.

GRE packets 120. Each GRE packet 120 comprise a payload, a GRE header 122 and an IP header 124. The payload includes the IP packet 110 received from the first network 150. The GRE header 122 indicates the type of protocol used to encapsulate the IP packet 110. The IP header 124 contains the router's real interface addresses.

Data flow through network 152 is managed using two data structures, namely an RIB 130 and a Forwarding Information Base (FIB) 132. The RIB stores a list of all available routes through network 152 that are known to the respective router 104, 106. The RIB requires manual configuration by an administrator 170 using a user command line interface (CLI) 172. As an example, source device 102 has an IPv4 address 192.168.1.0/24, while destination device 108 has an IPv4 address 192.168.2.0/24. Router 104 has a public IP unicast address 1.1.1.1 and router 106 has a public IP unicast address 2.2.2.2. Tunnel interface 160 has an IP address 172.16.1.1, while tunnel interface 162 has an IP address 172.16.1.2. TABLE 1 shows manually planned and entered CLI commands to configure the GRE tunnel between two routers.

TABLE 1

| | |
|---|---|
| R1(config)# interface Tunnel1 | R2(config)# interface Tunnel1 |
| R1(config-if)# ip address 172.16.1.1 | R2(config-if)# ip address 172.16.1.2 |
| R1(config-if)# ip mtu 1400 | R2(config-if)# ip mtu 1400 |
| R1(config-if)# ip tcp adjust-mss 1360 | R2(config-if)# ip tcp adjust-mss 1360 |
| R1(config-if)# tunnel source 1.1.1.1 | R2(config-if)# tunnel source 2.2.2.2 |
| R1(config-if)# tunnel destination 2.2.2.2 | R2(config-if)# tunnel destination 1.1.1.1 |

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Figure 1:
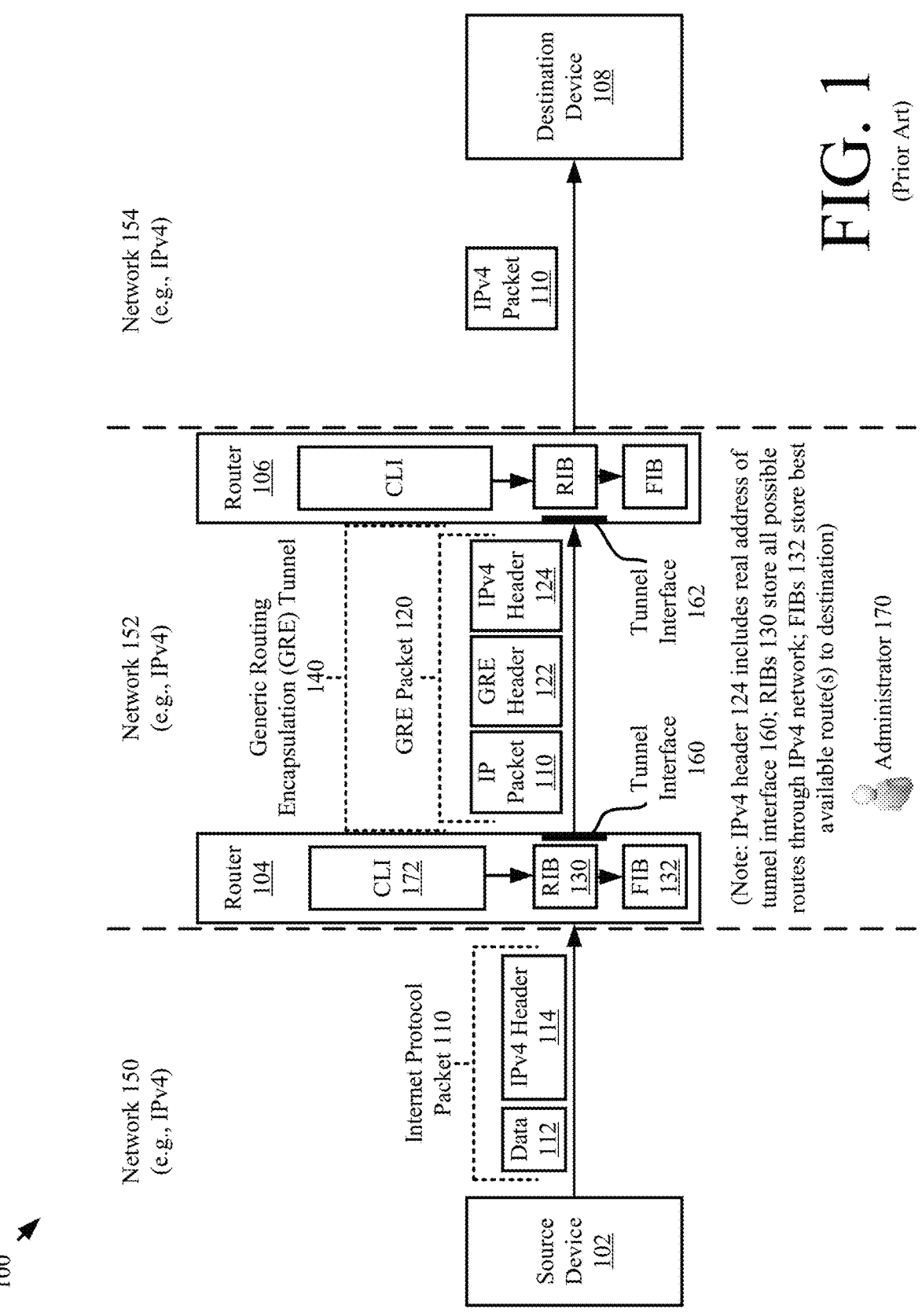
FIG. 1 provides an illustration of a system implementing a GRE tunnel using information of a Routing Information Base (RIB) which was manually input by an administrator.

FIG. 1 provides an illustration of a system 100 implementing GRE tunneling between networks 150, 154. Networks 150, 154 may include, but are not limited to, IPv4 networks. IP packets 110 are sent over the networks 150, 154 from a source device 102 to a destination device 108. Each IP packet 110 comprises data 112 and an IP header 114. The IP packets 110 are routed through an intermediary network 152 via routers 104, 106. Network 152 can include, but is not limited to, an IPv4 network. A GRE tunnel 140 is provided between the two routers 104, 106. GRE is a protocol for encapsulating the IP packets 110 with GRE packets to facilitate a direct point-to-point connection across network 152. Each router 104, 106 acts like an end node of the GRE tunnel 140, and therefore is configured to send and receive The quality of each route in the list may also contained in the RIB 130. The RIB 130 is used by the router 104, 106 to make decisions about the best available route(s) or path(s) for sending packets 110 to the destination device 108. The best available route(s)/path(s) is (are) stored in the FIB 132. The FIB 132 is used by the router 104, 106 to make decisions for forwarding packets 110. When the router 104, 106 receives a packet 110 from network 150, it obtains destination address from the packet header 114 and accesses the FIB 132 to retrieve the best available route/path to the destination device 108 associated with the destination address.

In some scenarios, the first and third networks 150, 154 have a wired connections between the routers 104, 106 and end-point device (e.g., personal computer or laptop). The second network 152 is composed of one or more wireless networks (e.g., multi-cast radio networks). The GRE tunnel 140 can convert multicast traffic into unicast traffic. This conversion can result in a reduced number of transmissions between routers, as shown by FIGS. 2-3. However, a technique is needed to automate GRE establishment with address deconfliction to, for example, reduce costs due to manual operations and eliminate human error. The present solution provides such a technique for automatedly establishing GRE tunnels over which multicast traffic is to be communicated.

FIG. 4 provides an illustration of a system 400 implementing the present solution. System 400 comprises networks 150, 452, 154. IP packets 110 are sent over the networks 150, 154 from a source device 102 to a destination device 108. Each IP packet 110 comprises data 112 and an IP header 114. The IP packets 110 are routed through an intermediary network 452 via routers 404, 406. Network 452 can include, but is not limited to, an IPv4 network. A GRE tunnel 440 is provided between the two routers 404, 406. The IP packet 110 is encapsulated with headers 424, 426 to provide GRE packet 420. Headers 424, 426 include a GRE header 424 and an IP header 426. These headers 424, 426 are the same as or similar to headers 122, 124 of FIG. 1. The GRE packet 420 facilitates a direct point-to-point connection across network 452. Each router 404, 406 acts like an end node of the GRE tunnel 440, and therefore is configured to send and receive GRE packets 420.

Each router 404, 406 is configured to automatically establish the GRE tunnel 440. In this regard, each router 404, 406 comprises an auto-GRE service module 408₁, 408₂ (collectively referred to as "408"), a table 430₁, 430₂ (collectively referred to as "430"), and an optional IP address list 432₁, 432₂ (collectively referred to as "432"). The operations of the auto-GRE service modules 408 will now be described in detail in relation to FIGS. 5-7.

FIG. 5 provides a flow diagram of a method 500 implemented by two routers for establishing a GRE tunnel. As shown in FIG. 5A, method 500 begins with 502 and continues to 504 where a first router (e.g., router 404 of FIG. 4) receives multicast member notification message(s) from other router(s). Each multicast member notification message indicates that the respective other router has a communication link with an end node that is a member of a multicast group. The multicast member notification message can be in a proprietary protocol format or in an existing protocol format. The multicast member notification message is passed to an auto-GRE service module (e.g., auto-GRE service module 408₁ of FIG. 4) of the first router. In response to the multicast member notification message, the auto-GRE service module of the first router performs operations in 506 to optionally add identification(s) of the other router(s) in a table (e.g., table 430₁ of FIG. 4) (e.g., when the other router is not listed in the table).

Next in 508, the first router receives a multicast packet (e.g., packet 110 of FIG. 4) from a node (e.g., source device 102 of FIG. 4) of a first network (e.g., network 150 of FIG. 4). After reception of the multicast packet, the auto-GRE service module detects that there is a need for a GRE tunnel as shown by block 510. Accordingly, the auto-GRE service module performs operations in blocks 512-516 to create the GRE tunnel. These operations involve: selecting a second router from the router table; selecting a base address from a set of unused base addresses; and sending an auto-tunnel create message with the selected base address to the second router. The set of unused based addresses can be pre-defined IP addresses and/or include IPv4 class E addresses. The set of unused base addresses may be stored in a datastore (e.g., datastore 434 of FIG. 4) of the first router. The base address can be selected: in a sequential manner (e.g., first base address in the set is selected, followed by a selection of the next base address, and so on); in a non-sequential manner (e.g., first base address in the set is selected, followed by a selection of the third base address in the set, and so on); or in accordance with a random or pseudo-random algorithm.

At the second router in block 518, operations are performed by an auto-GRE service module (e.g., auto-GRE service module 408₂ of FIG. 4) to verify that the selected base address is not currently being used. If verification is not made that the selected base address is unused [520: NO], then method 500 continues to block 522 where the second router generates and sends a NACK message to the first router. An alternative base address may or may not be sent along with the NACK message. After the NACK message is received by the first router, method 500 may return to block 514.

In contrast, if verification is made the selected base address is unused [520: YES], then method 500 continues to block 526 where the second router generates and sends an ACK message to the first router. After the ACK message is received, the auto-GRE service module of the first router performs operation in block 528 to create the GRE tunnel (e.g., GRE tunnel 440 of FIG. 4. The GRE tunnel is created by, for example: creating a first end of the GRE tunnel using the selected base address for the first router; sending a CONFIRM message from the first router to the second router; and creating a second end of the GRE tunnel using an incremented version of the selected base address for the second router. The incremented version can include the selected base address incremented by a given number. The given number can include, but is not limited to, one. Thereafter, method 500 continues to block 520 of FIG. 5B.

As shown in FIG. 5B, block 530 involves communicating the multicast packet (e.g., packet 110 of FIG. 4) over the GRE tunnel. Subsequently, method 500 may optionally continue with operations of blocks 532, 534, and/or 536. In block 532, the first router receives a multicast drop notification from the second router. In block 534, the GRE tunnel is terminated. The GRE tunnel can be terminated based on, for example, whether there are no longer any multicast groups associated therewith (i.e., the GRE tunnel is not needed by either router). In some scenarios, the first router and/or the second router have connections to end nodes of two or more multicast groups. The same GRE tunnel may be used for a single multicast group or for multiple multicast groups. In block 536, the identifier for the second router is removed from the router table of the first router. Subsequently, method 500 continues to block 538 where it ends or other operations are performed (e.g., return to 502 of FIG. 5A).

Referring now to FIG. 6, there is provided an illustration showing messaging between nodes for creating and terminating a GRE tunnel. As shown in FIG. 6A, the messaging begins with an IGMP membership request 602 which is sent from a second end node device (e.g., destination device 108 of FIG. 4) to a second router (e.g., router 406 of FIG. 4). In response to the IGMP membership request 602, the second router generates and sends a multicast member notification 604 to a first router (e.g., router 404 of FIG. 4). At the first router, an auto-GRE service module (e.g., auto-GRE service module 408₁ of FIG. 4) performs operations in block 606 to add an identifier for the second router to a table (e.g., table 430₁ of FIG. 4).

At some later time, a packet 608 is sent from a first end node device (e.g., source device 102 of FIG. 4) to the first router. The auto-GRE service module of the first router then perform operations in block 610 to detect that a GRE tunnel is needed. As such, the auto-GRE service module selects a base address from a set of unused base addresses (e.g., IPv4 class E addresses), as shown by block 612. The auto-GRE service module also generates an auto-tunnel create message 614 and sends the same to the second router. At the second router, another auto-GRE service module (e.g., auto-GRE service module 408₂ of FIG. 4) verifies that the base address is unused as shown by block 616. This verification can be made simply by comparing the base address to a list of base addresses that are in use by the second router and/or other routers. After such verification, the second router generates and sends a tunnel create ACK message 618 to the first router. Upon receipt of this message, the auto-GRE service module creates a GRE tunnel using the base address as the address for the first router. The base address may be an even numbered address. A tunnel create confirmation message 622 is then sent from the first router to the second router. In block 624, the auto-GRE service module creates a GRE tunnel using an incremented version of the base address. The incremented version may be generated simply by adding an odd number (e.g., one) to the even numbered base address. The auto-GRE service module then creates the GRE tunnel in block 624 using the incremented version of the base address.

Once the GRE tunnel is created, the first router creates a GRE packet 626 with a payload including the packet for the multicast group. The GRE packet 626 is communicated from the first router to the second router using the GRE tunnel. The second router than de-encapsulates the packet for the multicast group, and communicates the same to the second end node device.

Referring now to FIG. 6B, the messaging may continue with the generation and communication of an IGMP membership request 628 from the first end node device to the first router. The IGMP membership may be associated with the same or different multicast group as the one in block 602. The first router then generates and sends a multicast member notification 630 to the second router. At the second router, the auto-GRE service module adds an identifier of the first router to a table (e.g., table 430$_2$ of FIG. 4) maintained by the second router.

At some later time, the second router receives a packet 634 from the second end node device. The packet 634 is for a multicast group. The multicast group can be the same as or different than the multicast group associated with packet 608. In block 636, the auto-GRE service module of the second router performs operations to detect that a GRE tunnel already exists through which the packet 634 can be sent. Upon such detection, the auto-GRE service module of the second router encapsulates the packet 634 with headers to create a GRE packet 638. The GRE packet 638 is communicated from the second router to the first router. The first router extracts the packet 634 from the GRE packet and communicates the same to the first end node device.

At some later time, an IGMP membership drop message 640 is received at the second router. In response, the second router communicates a multicast member drop notification 642 to the first router. The first router optionally terminates the GRE tunnel in block 644 and removes the identifier for the second router from its router table.

FIG. 7 provides an illustration showing another messaging flow between nodes for creating a GRE tunnel. The messaging begins with a communication of a packet 702 from the first end node device (e.g., source device 102 of FIG. 4) to the first router (e.g., router 404 of FIG. 4). The auto-GRE service module of the first router then performs operations in block 704 to detect that a routing tunnel is needed. For example, this detection can be based on the first router's reception of a multicast member notification similar to that discussed above in relation to operations 604 of FIG. 6A. As such, the auto-GRE service module selects a base address from a set of unused base addresses (e.g., IPv4 class E addresses), as shown by block 706. The auto-GRE service module also generates an auto-tunnel create message 708 and sends the same to the second router.

At the second router, an auto-GRE service module (e.g., auto-GRE service module 408$_2$ of FIG. 4) performs operations in block 710 to verify whether the base address is unused. These operations can involve, for example, comparing the base address to a list of base address that are in use by the second router and/or other routers. As shown by block 712, the verification result indicates that the base address is not unused. Consequently, the second router generates and sends a tunnel create NACK message 714 to the first node. An alternative base address may be sent along with the tunnel create NACK message 714.

At the first router, the auto-GRE service module performs operations in block 716 to verify that a newly selected base address or the alternative base address (received from the second router) is unused. The verification result indicates that the base address is unused as shown by block 718. Consequently, the first router generates and sends an auto-tunnel create message 720 to the second router. Thereafter, the system loops through the tunnel creation process until a GRE tunnel is created. Once the GRE tunnel is created, the GRE packet 722 is generated and sent from the first router to the second router. The second router extracts packet 702 from the GRE packet and forwards the extracted packet 702 to the second end node device.

FIG. 8 provides a flow diagram of a method 800 for automatically managing tunnels in a network. The tunnels can include, but are not limited to, GRE tunnels. The network can include, but is not limited to, network 452 of FIG. 4. Method 800 begins with 802 and continues to block 804 where a router performs operations to detect that a tunnel is needed for communicating a packet to at least one member of a multicast group of another network. The router can include, but is not limited to, router 404 or 406 of FIG. 4. This detection can be made by extracting a multicast group identifier from a received packet and determining whether a tunnel is already established between the router and another router for communicating packets directed to the identified multicast group. If such a tunnel does not exist, then the router detects that a tunnel is needed in block 804.

In block 806, the router performs operations to select a base address from a set of unused base addresses. The unused base addresses can include, but are not limited to, IPv4 class E addresses and/or other addresses. Another router may also be selected from a table or list. The table or list can include, but is not limited to, table 430$_1$, table 430$_2$ or list 432$_1$ of FIG. 4. It should be noted that an identifier for the another router can be added to the router table or list upon the router's receipt of a multicast member notification from the another router. The multicast member notification can include, but is not limited to, multicast member notification 604 of FIG. 6A or 630 of FIG. 6B.

An auto-tunnel create message (including the selected base address) is communicated from the router in block 808. The auto-tunnel create message can include, but is not limited to, auto-tunnel create message 614 of FIG. 6A, 708 of FIG. 7, or 720 of FIG. 7. In block 810, the router receives a tunnel create ACK message sent from another router of the network upon the another router's verification that the base address is unused. The another router can include, but is not limited to, router 404 or 406 of FIG. 4.

Next, in block 812, the tunnel is created using the base address for the router and the another base address for the another router. The another base address may or may not be generated, for example, by incrementing the base address by a specified number. The base address may be an even numbered address, and the another base address may be an odd numbered address. The present solution is not limited in this regard. For example, both addresses can be even number address or odd numbered addresses in accordance with a given application. A packet for a multicast group is encapsulated in block 814 and sent over the tunnel in block 816. The tunnel may be used to communicate a packet for another different multicast group as shown by block 818.

Subsequently, method 800 may continue with block 820 where it ends or other operations are performed. These other operations can include, but are not limited to, the following operations: returning to block 802; terminating the tunnel; receiving, by the router, a multicast member drop notification from the another router; and removing the identifier for the another router from the router table or list in response to the multicast member drop notification. The multicast member drop notification can include, but is not limited to, the multicast member drop notification 642 of FIG. 6B. Additionally or alternatively, these other operations can include: receiving, by the router, a tunnel create NACK message sent from the another router when the another router determines that a base address is not unused; receiving, by the router, an alternative base address from the another router along with the tunnel create NACK message; and creating another tunnel using the alternative base address for the router and an incremented version of the alternative base address for the another router.

Referring now to FIG. 9, there is shown a hardware block diagram comprising an example computer device 900 that can be used for implementing the present solution. Router 404 and/or router 406 of FIG. 4 may be the same as or similar to computer system 900. As such, the discussion of computer device 900 is sufficient for understanding routers 404, 406 of FIG. 4.

Computing device 900 may include more or less components than those shown in FIG. 9. However, the components shown are sufficient to disclose an illustrative solution implementing the present solution. The hardware architecture of FIG. 9 represents one implementation of a representative computing device configured to enable automatic and/or automated tunnel creation and termination, as described herein. As such, the computing device 900 of FIG. 9 implements at least a portion of the method(s) described herein.

Some or all the components of the computing device 900 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 900 comprises a user interface 902, a Central Processing Unit ("CPU") (or processor) 906, a system bus 910, a memory 912 connected to and accessible by other portions of computing device 900 through system bus 910, and hardware entities 914 connected to system bus 910. The user interface can include input devices and output devices, which facilitate user-software interactions for controlling operations of the computing device 900. The input devices include, but are not limited, a physical and/or touch keyboard 950. The input devices can be connected to the computing device 900 via a wired or wireless connection (e.g., a Bluetooth® connection). The output devices include, but are not limited to, a speaker 952, a display 954, and/or light emitting diodes 956.

At least some of the hardware entities 914 perform actions involving access to and use of memory 912, which can be a Random Access Memory ("RAM"), a disk driver and/or a Compact Disc Read Only Memory ("CD-ROM"). Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 900. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for automatically managing tunnels in a network, comprising:

detecting, by a router of the network, that a tunnel is needed for communicating a packet to at least one member of a multicast group of another network;

selecting, by the router, a base address from a set of unused base addresses;

communicating, from the router, an auto-tunnel create message including the base address which was previously selected;

receiving, by the router, a tunnel create acknowledgement (ACK) message sent from another router of the network upon the another router's verification that the base address is unused;

receiving, by the router, a tunnel create negative acknowledgement (NACK) message sent from the another router of the network when the another router determines that the base address is not unused;

receiving, by the router, an alternative base address from the another router along with the tunnel create NACK message;

creating the tunnel using the base address for the router and another base address for the another router;

encapsulating the packet; and communicating the encapsulated packet from the router to the another router using the tunnel which was created.

2. The method according to claim 1, further comprising generating the another base address by incrementing the base address by a specified number.

3. The method according to claim 1, wherein the base address is an even numbered address and the another base address is an odd numbered address.

4. The method according to claim 1, wherein the set of unused base addresses comprise internet protocol version 4 (IPv4) class E addresses.

5. The method according to claim 1, further comprising:

receiving, by the router, a multicast member notification from the another router; and adding an identifier for the another router to a router table or list that is maintained by the router.

6. The method according to claim 5, further comprising selecting the another router from the router table or list in response to said detecting.

7. The method according to claim 5, further comprising:

receiving, by the router, a multicast member drop notification from the another router; and removing the identifier for the another router from the router table or list in response to the multicast member drop notification.

8. The method according to claim 1, further comprising using the tunnel to communicate a packet to at least one member of another different multicast group.

9. The method according to claim 1, further comprising terminating the tunnel after said communicating.

10. The method according to claim 1, further comprising creating another tunnel using the alternative base address for the router and an incremented version of the alternative base address for the another router.

11. A router, comprising:

a processor;

a non-transitory computer-readable storage medium comprising programming instructions that are configured to cause the processor to implement a method for automatically managing tunnels in a network, wherein the programming instructions comprise instructions to:

detect that a tunnel is needed for communicating a packet to at least one member of a multicast group of another network;

select a base address from a set of unused base addresses;

communicate an auto-tunnel create message including the base address which was previously selected;

receive a tunnel create acknowledgement (ACK) message sent from another router upon the another router's verification that base address is unused;

create the tunnel using the base address for the router and another base address for the another router;

encapsulate the packet; and communicate the encapsulated packet from the router to the another router using the tunnel which was created;

wherein the programming instructions further comprise instructions to receive a tunnel create negative acknowledgement (NACK) message sent from the another router when the another router determines that the base address is not unused, and receive an alternative base address from the another router along with the tunnel create NACK message.

12. The router according to claim 11, wherein the base address is an even numbered address and the another base address is an odd numbered address.

13. The router according to claim 11, wherein the set of unused base addresses comprise internet protocol version 4 (IPv4) class E addresses.

14. The router according to claim 11, wherein the programming instructions further comprise instructions to:

receive a multicast member notification from the another router; and add an identifier for the another router to a router table or list that is maintained by the router.

15. The router according to claim 14, wherein the programming instructions further comprise instructions to select the another router from the router table or list after detect that a tunnel is needed.

16. The router according to claim 14, wherein the programming instructions further comprise instructions to:

receive a multicast member drop notification from the another router; and remove the identifier for the another router from the router table or list in response to the multicast member drop notification.

17. The router according to claim 11, wherein the programming instructions further comprise instructions to use the tunnel to communicate a packet to at least one member of another different multicast group.

18. The router according to claim 11, wherein the programming instructions further comprise instructions to terminate the tunnel after the encapsulated packet is communicated over the tunnel.

19. The router according to claim 11, wherein the programming instructions further comprise instructions to create another tunnel using the alternative base address for the router and an incremented version of the alternative base address for the another router.

* * * * *